(No Model.)
C. H. & A. STONE.
ROTARY ENGINE.
No. 505,334. Patented Sept. 19, 1893.
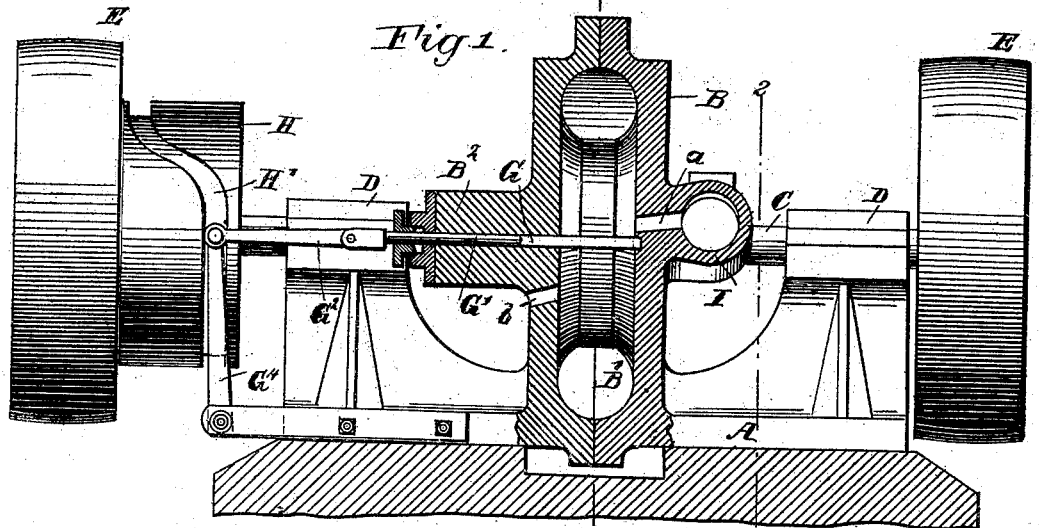
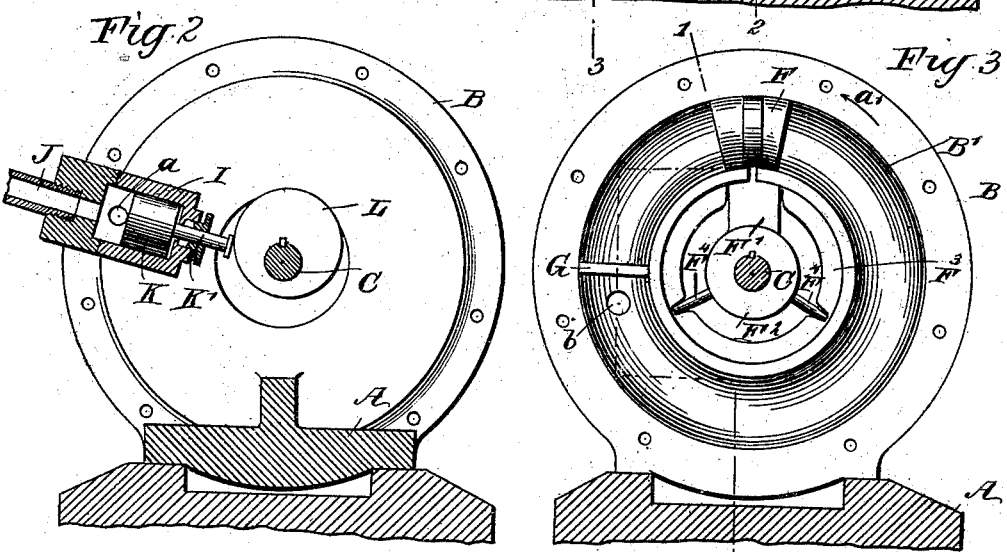
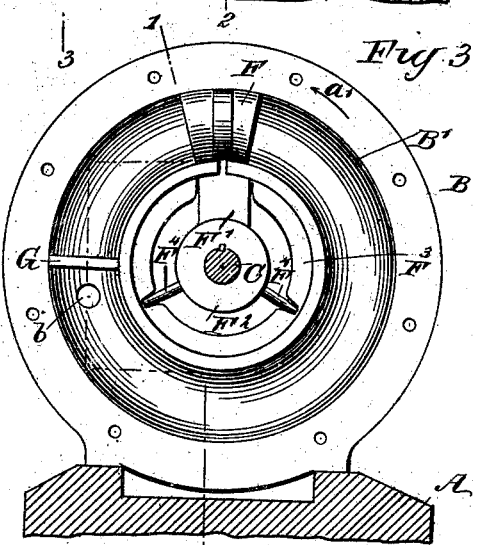
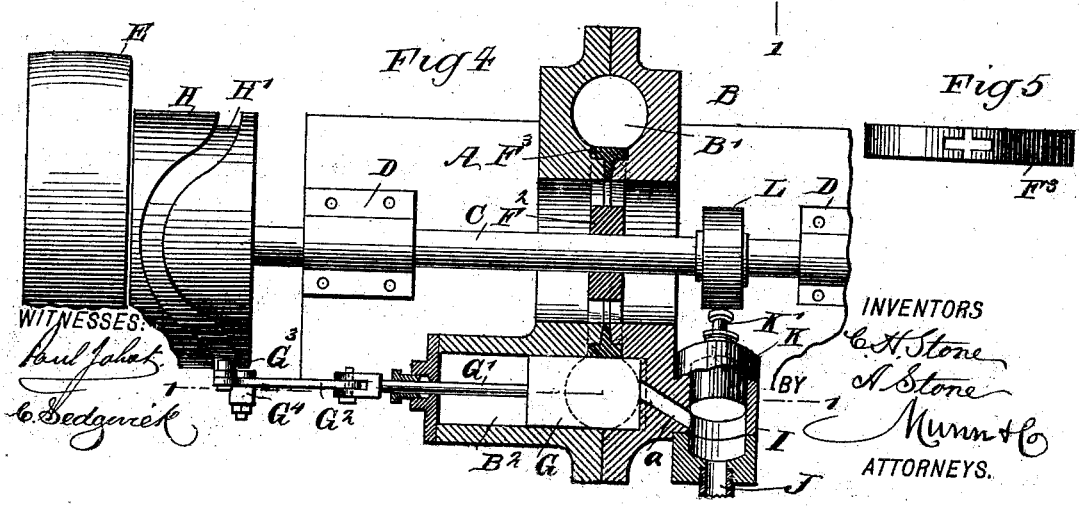
WITNESSES:
INVENTORS
C. H. Stone
A. Stone
BY Munn & Co.
ATTORNEYS.

UNITED STATES PATENT OFFICE.

CHARLES H. STONE AND ALONZO STONE, OF RINGGOLD, TEXAS, ASSIGNORS TO THEMSELVES AND JAMES W. LONG, OF SAME PLACE.

ROTARY ENGINE.

SPECIFICATION forming part of Letters Patent No. 505,334, dated September 19, 1893.

Application filed June 12, 1893. Serial No. 477,362. (No model.)

*To all whom it may concern:*

Be it known that we, CHARLES H. STONE and ALONZO STONE, of Ringgold, in the county of Montague and State of Texas, have invented a new and Improved Rotary Engine, of which the following is a full, clear, and exact description.

The object of the invention is to provide a new and improved rotary engine, which is simple and durable in construction, very effective in operation and arranged to utilize the motive agent to the fullest advantage.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement on the lines 1—1 of Figs. 3 and 4. Fig. 2 is a cross section of the same on the line 2—2 of Fig. 1. Fig. 3 is a similar view of the same on the line 3—3 of Fig. 1. Fig. 4 is a sectional plan view of the same; and Fig. 5 is a plan view of the packing ring.

The improved rotary engine is provided with a suitably constructed base A, carrying a cylinder B, having an annular bore B', and preferably made in two parts so as to be conveniently fastened together. Through the cylinder B passes centrally the main driving shaft C, journaled in suitable bearings D, erected on the base A, the outer ends of the said shaft carrying pulleys E, for transmitting the rotary motion of the engine to other machinery.

Within the annular bore B' of the cylinder B is arranged to travel a piston F, secured on a radially-extending arm F', secured with its hub F² on the main driving shaft C, the said arm F' extending through an annular slot formed in the cylinder and leading to the bore B'. In order to prevent leakage of the motive agent through this slot in the cylinder a packing ring F³ is provided, fitted into the said slot and supported on arms F⁴, projecting from the hub F², the said packing ring being split and curved to fit over the arm F' as will be readily understood by reference to Figs. 3 and 5. The top divided or split portion of the packing ring rests on the under side of the piston F, so that no motive agent can escape through the split as the same is covered by the piston F. Into the annular bore B' of the cylinder B extends a gate G, mounted to slide longitudinally in an offset B², projecting from one side of the cylinder B as plainly shown in Figs. 1 and 4. The gate G is provided with an outwardly-extending stem G', passing through a suitable stuffing box on the offset B² and pivotally-connected at its outer end with a link G², supporting a friction roller G³, engaging a cam groove H' formed in the periphery of a cam H, secured on the main driving shaft C. The free end of the link G² is pivotally-connected with a lever G⁴, fulcrumed on the base A and serving to hold the link G² in a proper position, at the same time permitting the link to move longitudinally according to the action of the cam groove H' on its friction roller G³.

Into the annular bore B' of the cylinder B leads a steam inlet port $a$, located at one side of the gate G and connected with a short cylindrical steam chest I, provided with a steam inlet pipe J, connected with the steam supply. In the steam chest I is arranged a piston valve K, adapted to open and close the said port $a$ to permit steam to pass to the annular bore B' or to cut it off therefrom. The stem K' of the piston valve K is arranged radially relative to the shaft C, and abuts on the periphery of an eccentric cam L, secured on the said main shaft as will be readily understood by reference to Figs. 2 and 4. From the bore B' leads an exhaust port $b$, through one of the walls of the cylinder B to the outside, the said port $b$ being at the opposite side of the gate G to that containing the inlet port $a$.

The operation is as follows: When the several parts are in the position as illustrated in the drawings, the motive agent from the steam inlet pipe J can pass through the steam chest I and port $a$ into the annular bore B' of the cylinder B at one side of the gate G, to act on the piston F so that the latter is caused to travel in the bore in the direction of the arrow $a'$, as plainly shown in Fig. 3. The action of the piston F causes a turning of the shaft C, so that movement is transmitted to the machinery to be driven. The steam in front of the piston is exhausted through the port $b$. Now, when the piston F nears the closed gate G then the cam H by its cam groove H', causes a sliding of the link $G^2$, the stem G' and gate G, to withdraw the latter from the bore to permit the piston F to pass. As soon as the piston F has passed the gate, then the latter is again caused to slide inward by the action of the cam H and then the piston valve K, which had previously closed the port $a$, uncovers the latter, the said piston valve K being forced inward by the pressure of the steam in the steam chest I, the eccentric cam L at that time permitting such movement. It will be seen that the steam can be cut off at any desired time by setting the eccentric cam L accordingly, it being understood that the said eccentric cam L exerts an outward pressure against the stem K' to cause the piston valve K to slide outward in the steam chest I to close the port $a$. The inward movement of the piston valve K is as above described, caused by the action of the live motive agent.

It will be seen that this rotary engine is very simple and durable in construction, and can use the steam expansively, as the motive agent can be cut off at any point in the stroke of the piston. Thus, the motive agent is utilized to the fullest advantage.

Having thus fully described our invention, we claim as new and desire to secure by Letters Patent—

1. In a rotary engine, the combination, with a central driving shaft, the cylinder having an annular bore, or passage, whose inner side is slotted, and the piston fitting in said bore and attached to an arm of said driving shaft, of the divided packing-ring, fitting into the aforesaid slot and having its ends provided with slots to receive the piston arm, as and for the purpose specified.

2. A rotary engine, comprising a cylinder having an annular bore and provided with an inlet port and an exhaust port, a gate mounted to slide in the said bore between the said ports, a piston mounted to travel in the said bore and provided with an arm secured on the main driving shaft, a cam mechanism, substantially as described, for actuating the said gate, a steam chest containing a piston valve for controlling the said inlet port, the said piston valve being actuated in one direction by the live motive agent to uncover the said inlet port, and an eccentric cam held on the main driving shaft and adapted to move the said piston valve in an opposite direction to close the said inlet port, substantially as shown and described.

CHARLES H. STONE.
ALONZO STONE.

Witnesses:
LOUIS W. SMITH,
JAMES B. BAILEY.